UNITED STATES PATENT OFFICE.

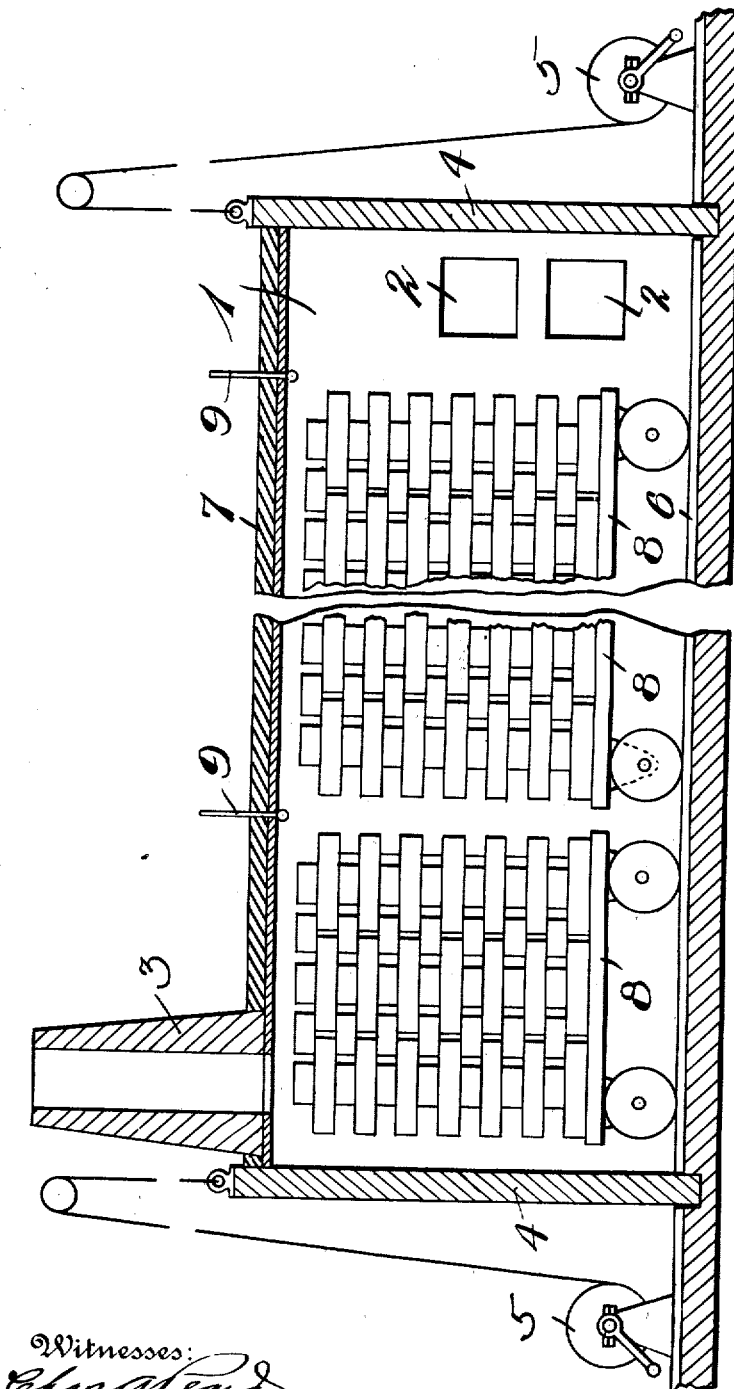

RICHARD CLAUS, DECEASED, LATE OF EAST ORANGE, NEW JERSEY, BY IDA CLAUS, EXECUTRIX, OF MONTAGUE TOWNSHIP, SUSSEX COUNTY, NEW JERSEY.

PROCESS OF TREATING FULLERS' EARTH.

1,156,466.  Specification of Letters Patent.  Patented Oct. 12, 1915.

Application filed December 27, 1913. Serial No. 808,946.

*To all whom it may concern:*

Be it known that RICHARD CLAUS, late a citizen of the United States, and resident of East Orange, in the county of Essex, State of New Jersey, deceased, did invent certain new and useful Improvements in Processes for Treating Fullers' Earth, of which the following is a full, clear, and exact description.

This invention relates to the treating of fullers' earth, and has for its object to provide a process of treating fullers' earth so that it shall be suitable for use in connection with edible oils and the like, particularly such fullers' earth as is found in the neighborhood of the Manatee river, Florida, which, when treated by processes heretofore used, is found to impart a disagreeable taste or odor to edible products such as oils and the like, when such products are bleached or purified by it.

It further has for its object to treat fullers' earth for pulverization in such a manner as not to impair its efficiency, and to that extent may be advantageously used wherever it is necessary to dry fullers' earth prior to grinding the same.

The mined or crude fullers' earth as it comes from the pits has to be dried in order to grind it. The percentage of moisture in such earth usually runs as high as 40%. It may be partially dried in the open air, but air-dried Manatee county fullers' earth still contains moisture to the extent of about $7\frac{1}{2}$%. In practice heretofore the drying to enable it to be pulverized has been done usually in artificially heated rotary driers. In the old process of drying the earth taken from the pit, the junks and lumps in it are not dried uniformly when passing through the rotary drier. The moist earth forms into balls the interior of which is not subjected to the proper heat, while the exterior is liable to be overheated. The quantity of water which has to be evaporated to produce one ton of dry earth from a crude earth carrying 40% of moisture, amounts to 1,000 pounds and more. The large quantity of crude earth which necessarily must in practice pass through the drier in a short space of time has no chance to dry out evenly in the short time permitted. The steam laden atmosphere in the rotary drier is not well adapted to help drying, even though the whole mass of earth is kept constantly moving and rolling toward the discharge end. Exhaust fans have been used to overcome this somewhat, but the large volume of air sucked through the drier lowers the inside temperature of the rotary drier very considerably and entails a great waste of fuel. The average product of such a drier is for economical reasons dried just enough to be ground. On the other hand, an under-feeding of a rotary drier with earth might spoil the earth by overheating it, besides entailing a larger proportional fuel expense. When the earth is overheated, the overheated portions to a large extent lose their efficiency and act merely as an adulterant for the earth which is not overheated.

By the present invention danger of reducing the efficiency of the earth by overheating is avoided and yet the moisture is removed to such an extent that it is not only capable of being ground, but so that when used for treating edible products it no longer imparts to such products the taste to which objection has heretofore been raised. The latter result is produced by driving off substantially all the moisture originally contained in the crude earth.

The following is a description of a process embodying the invention, reference being had to the accompanying drawing which shows the longitudinal section of a drying apparatus used therein.

In carrying out the improved process, one may proceed as follows: The mined earth, while still damp, is formed into the shape of bricks by any suitable brick-making machine. The bricks are then piled up, leaving air spaces between them so they may dry out somewhat in the open air. They are then introduced into a tunnel or chamber through which heated air or other gases are passed at a temperature ranging from 120° to 300° Celsius, preferably between 150° to 200° Celsius. The bricks are subjected to the heated gases for a period of about one hour or more, according to the size of the bricks, until substantially all the original moisture is driven off. During this heating process, vapors and steam of a bad smell are given off by the earth, and it changes slightly its color and loses (reference is made to an air dried earth from the Manatee River) about $7\frac{1}{2}$% of its weight. After the bricks have been subjected to the hot gases as above referred to, they are ready to be removed from the tunnel and are substantially ground so as to be reduced to subdivided form. The loss in weight which occurs during the heating process is recovered afterward very rapidly by the absorption of moisture from the atmosphere.

In carrying out this invention, a tunnel 1 is provided having flues 2—2 through which hot gases, such for instance as hot air or products of combustion, are supplied and from which they are discharged by the stack 3. The chamber is provided with doors 4—4 and means 5 for opening and closing these doors. It is also provided with rails 6. In order to prevent too rapid radiation of heat, it is preferably covered with heat insulation material 7. There is further provided a plurality of cars 8 traveling upon the rails 6 for carrying the bricks. This arrangement permits of a continuous operation, so that when one car enters at one end, another car is shoved out at the other end. The tunnel is provided with thermometers 9 to indicate the temperature inside the chamber and to aid in keeping the temperature at the desired point.

In carrying out the invention with this apparatus, the bricks are first formed and air-dried as above indicated, and when fairly dry are then piled upon trucks or cars which are then pushed into the chamber, one car being removed and another car introduced, so that each car remains in the chamber the necessary time, as above indicated. The cars are preferably introduced at the stack end of the chamber and removed from the flue end, so that the bricks will be subjected to the highest temperature during the period directly preceding their removal from the chamber. No portion of the earth is subjected to a very high degree of temperature, and the temperature used is easily controllable so that no portion of the earth is liable to be injured by overheating. It is all subjected to substantially the same degree of temperature, and in this way the process differs from processes carried out by the use of a rotary drier, in which part of the earth must necessarily be subjected to a much higher degree of temperature than that which is sufficient to evaporate the moisture, and part of the earth will not become heated up to that point where all the moisture is given off. The product of the old process therefore results in an overheated portion whose efficiency is decreased, and an underheated portion which is objectionable on account of the taste which it imparts. The overheated earth will not absorb as much moisture as fully dried earth which is not overheated absorbs, and this is probably the reason for the decreased efficiency of the overheated earth. Earth which is not overheated when fully dried quickly absorbs again when exposed to the air as much moisture as that contained by earth dried in the open air, and is very efficient.

In order to hasten matters, the earth can be partially dried in any suitable drying means heated to a point such that the earth cannot be overheated and then subjected to the extended heating process in the chamber above referred to at a comparatively low temperature to free it from obnoxious constituents. When the earth is treated in this manner it is not made into bricks but is preferably placed upon large shallow trays which are placed on the cars and thus introduced into the heating chamber.

In carrying out the improved process, while making bricks from the wet earth, any loose earth in the form of fine powder may be mixed in and so saved from waste. Furthermore, the dried bricks need not be ground on the spot. They can be shipped anywhere with less cost than the bagged ground fullers' earth and are ground where desired.

To facilitate the forming of bricks, a small percentage of other materials may be added to the raw wet earth in the machine which makes the bricks. This material must be inert to the products to be refined by the earth. They should only act as a binder. Such materials may be clay, sugar, starch and the like, or anything which will accomplish the binding purpose without spoiling the earth, the selection being made according to the purpose to which the earth is to be put.

As will be evident to those skilled in the art, the invention permits of various modifications without departing from the spirit thereof or the scope of the appended claims.

What is claimed is:

1. In the process of treating fullers' earth the improvement which comprises subjecting moist fullers' earth to a temperature above the boiling point of water without overheating it for an extended period until the moisture is substantially all driven off and subsequently reducing the same to subdivided form.

2. In the improved process of treating fullers' earth the improvement which comprises inclosing it in a chamber and passing gases through said chamber heated to a temperature above the boiling point of water, without overheating the earth, until the moisture is substantially all driven off and subsequently reducing the same to subdivided form.

3. In the process of treating fullers' earth the improvement which consists in partially drying the same at a temperature below the boiling point of water and subsequently passing gases heated to a point above the boiling point of water over the same while confined in a suitable chamber for an extended period, without overheating the earth, until the moisture is substantially all driven off and subsequently reducing the same to subdivided form.

4. In the process of treating fullers' earth the improvement which consists in forming the crude fullers' earth into bricks, permitting the same to partially dry in the atmosphere and then subjecting the bricks to gases heated to a point above the boiling point of water and passed over the same while confined in a closed chamber for an extended period, without overheating the earth, until the moisture is substantially all driven off and subsequently reducing the same to subdivided form.

5. In the process of treating fullers' earth the improvement which consists in forming the same into bricks, partially drying the same and then passing gases over the same heated to a temperature between 120° and 300° Censius for an extended period until substantially all the moisture is driven off and subsequently reducing the same to subdivided form.

6. In the process of treating fullers' earth, the improvement which comprises subjecting moist fullers' earth to a temperature between 120° and 300° Celsius for an extended period until substantially all the moisture is driven off and subsequently reducing the same to subdivided form.

7. In the process of treating fullers' earth the improvement which consists in forming the crude fullers' earth into bricks of uniform size and shape, permitting the same to partially dry in the atmosphere and then subjecting the bricks to gases heated to a point above the boiling point of water and passed over the same while confined in a closed chamber for an extended period, without overheating the earth, until the moisture is substantially all driven off, and subsequently reducing the same to subdivided form.

8. In the process of treating fullers' earth the improvement which consists in forming the same into bricks of uniform size and shape, partially drying the same and then passing gases over the same heated to a temperature between 120° and 300° Celsius for an extended period until substantially all the moisture is driven off, and subsequently reducing the same to subdivided form.

IDA CLAUS,
*Executrix of the estate of Richard Claus.*

Witnesses:
   ALFRED MARVIN,
   PAUL PFLUG.

It is hereby certified that in Letters Patent No. 1,156,466, granted October 12, 1915, upon the application of Ida Claus, of Montague township, Sussex county, New Jersey, as executrix of Richard Claus, deceased, for an improvement in "Processes of Treating Fullers' Earth," an error appears in the printed specification requiring correction as follows: Page 2, line 3, for the word "substantially" read *subsequently;* and that the said Letters Patent should be read with this correction therein that the same may conform to the record of the case in the Patent Office.

Signed and sealed this 9th day of November, A. D., 1915.

[SEAL.]

J. T. NEWTON,
*Acting Commissioner of Patents.*